(12) United States Patent
Lyubomirsky et al.

(10) Patent No.: US 9,054,808 B2
(45) Date of Patent: Jun. 9, 2015

(54) CONTROLLED DEPOLARIZATION USING CHIRP FOR MITIGATION OF NONLINEAR POLARIZATION SCATTERING

(75) Inventors: Ilya Lyubomirsky, Pleasanton, CA (US); Alan C. Nilsson, Mountain View, CA (US)

(73) Assignee: Infinera Corporation, Sunnyvale, CA (US)

( * ) Notice: Subject to any disclaimer, the term of this patent is extended or adjusted under 35 U.S.C. 154(b) by 174 days.

(21) Appl. No.: 13/177,250

(22) Filed: Jul. 6, 2011

(65) Prior Publication Data
US 2012/0106980 A1 May 3, 2012

Related U.S. Application Data

(60) Provisional application No. 61/391,401, filed on Oct. 8, 2010.

(51) Int. Cl.
*H04B 10/04* (2006.01)
*H04J 14/06* (2006.01)
*H04B 10/08* (2006.01)
*H04B 10/2507* (2013.01)

(52) U.S. Cl.
CPC .................................. *H04B 10/2572* (2013.01)

(58) Field of Classification Search
CPC ... H04J 14/06; H04B 10/505; H04B 10/5051; H04B 10/5055
USPC .......................................... 398/182, 183, 185
See application file for complete search history.

(56) References Cited

U.S. PATENT DOCUMENTS

| 6,211,996 | B1 * | 4/2001 | Fuse ................................ 359/278 |
| 8,116,635 | B2 * | 2/2012 | Tanimura et al. ............. 398/184 |
| 8,164,816 | B1 * | 4/2012 | Savchenkov et al. ......... 359/245 |
| 8,238,747 | B2 * | 8/2012 | Xu et al. ......................... 398/65 |
| 8,331,802 | B2 * | 12/2012 | Fujii .............................. 398/203 |
| 2002/0003641 | A1 * | 1/2002 | Hall et al. ..................... 359/122 |
| 2003/0108265 | A1 * | 6/2003 | Rao et al. ........................ 385/11 |
| 2003/0147646 | A1 * | 8/2003 | Zitelli ............................. 398/65 |
| 2003/0206676 | A1 * | 11/2003 | Ovadia et al. ................... 385/11 |

(Continued)

FOREIGN PATENT DOCUMENTS

WO    WO 2010026894 A1 *   3/2010

OTHER PUBLICATIONS

Ito_international_bib (bib sheet for ito).*

*Primary Examiner* — Oommen Jacob
(74) *Attorney, Agent, or Firm* — Harrity & Harrity LLP; David L. Soltz (57) ABSTRACT

A coherent optical transmitter circuit is disclosed in which controlled chirp is employed, enabling the suppression of nonlinear polarization scattering in dual polarization coherent systems, such as those which employ dual polarization-quadrature phase-shift keying (DP-QPSK). By separately chirping the modulated signals of each polarization tributary signal, the polarization state of the output DP-QPSK signal varies during a time period corresponding to a symbol bit period. Such controlled variations in the output DP-QPSK signal result in the mitigation of nonlinear effects associated with the network infrastructure over which the signal is transmitted, resulting in enhanced system performance. Enhanced system performance, for example, can be seen in greater reach and improved signal quality of the transmitted signal.

38 Claims, 10 Drawing Sheets

(56) References Cited

U.S. PATENT DOCUMENTS

| | | |
|---|---|---|
| 2005/0213975 A1* | 9/2005 | Gottwald et al. ............... 398/65 |
| 2008/0152360 A1* | 6/2008 | Bennett .......................... 398/204 |
| 2010/0067914 A1* | 3/2010 | Tanaka et al. ................. 398/102 |
| 2010/0215374 A1* | 8/2010 | Liu et al. .......................... 398/98 |
| 2010/0260504 A1* | 10/2010 | Takahara ....................... 398/152 |
| 2011/0013911 A1* | 1/2011 | Alexander et al. .............. 398/79 |
| 2011/0150465 A1* | 6/2011 | Ito .................................... 398/43 |
| 2011/0170877 A1* | 7/2011 | Akiyama ....................... 398/185 |
| 2012/0106980 A1* | 5/2012 | Lyubomirsky et al. ....... 398/185 |

* cited by examiner

CONTROLLED DEPOLARIZATION USING CHIRP FOR MITIGATION OF NONLINEAR POLARIZATION SCATTERING

This application claims the benefit of U.S. Provisional Application No. 61/391,401, filed Oct. 8, 2010, which is incorporated herein by reference.

BACKGROUND OF THE INVENTION

Description of the Related Art

Digital coherent receivers have been employed in optical communication systems in order to correct for linear impairments, such as chromatic dispersion and polarization mode dispersion. A digital coherent receiver also provides an efficient demodulation of complex signal constellations, and polarization de-multiplexing, thus enabling higher spectral efficiencies. However, nonlinear transmission effects remain a problem in conventional wavelength division multiplexed (WDM) systems. One reason for this is that inter-channel nonlinear effects may not be easily compensated in the digital signal processing (DSP) of the receiver. Moreover, widespread use of polarization multiplexing to increase spectral efficiency makes these systems much more susceptible to nonlinear polarization scattering, a nonlinear phenomenon not readily observed in earlier single polarization on-off keying (OOK) systems.

Several techniques have been proposed recently to reduce the impact of nonlinear polarization scattering in dual-polarization coherent systems, but have resulted in limited success. Such techniques include RZ pulse shaping in combination with symbol-interleaving of the polarization tributaries of a dual polarization transmitter, which can suffer from complexity of implementation, as well as reduced performance in the presence of significant polarization mode dispersion (PMD). DSP based compensation techniques have also been proposed. However, such systems are unnecessarily complex and show only modest performance improvement. Also, chirp has been used to mitigate nonlinear effects in single-polarization OOK and differential quadrature phase shift keying (DQPSK) systems.

However, there is a need for suppressing nonlinear polarization scattering in dual polarization coherent systems, such as those which employ dual polarization-quadrature phase-shift keying.

SUMMARY OF THE INVENTION

Consistent with the present disclosure, a transmitter is provided which employs chirp for suppressing nonlinear polarization scattering in dual polarization coherent systems. Such systems may, for example, employ dual polarization-quadrature phase-shift keying. In a first aspect, the transmitter may include first and second phase modulators. The first phase modulator may modulate a phase of a first modulated data signal in accordance with a first clock signal to generate a first modulated output signal. In similar fashion, the second modulator may modulate a phase of a second modulated data signal in accordance with a second clock signal to generate a second modulated output signal. The first and second modulated output signals may then be combined in a polarization beam combiner to provide a combined output signal having a net state of polarization which changes during a corresponding symbol period associated with the first and second modulated data signals. Such changes may be induced by the first and second phase modulators in accordance with the first and second clock signals. The changes in the net state of polarization may be provided in a controlled manner and used to desirably offset or mitigate nonlinear effects associated with transmission of the combined output signal over a network infrastructure.

In certain embodiments a clock period of the first clock signal is the same as a clock period of the second clock signal, and a differential phase between the first and second clock signals is non-zero. A symbol period of the first and second modulated data signals may be the same as the clock period of the corresponding first and second clock signals, respectively. An optimum output may be provided by varying the differential phase between the first and second clock signals and/or varying the corresponding phase modulation amplitudes of the first and second clock signals.

In still other embodiments, the transmitter may include first and second data modulators. The first data modulator may modulate a first light with a first data stream to generate the first modulated data signal. Similarly, the second data modulator may modulate a second light with a second data stream to generate the second modulated data signal. The first and second lights may be provided by the same light source or by different light sources, provided the different light sources are phase-locked to one another. The first light may have a first polarization and the second light may have a second polarization different from the first polarization. In certain embodiments, each of the first and second lights are supplied by either a distributed feedback laser or a distributed Bragg reflector laser.

In another aspect, a method for mitigating nonlinear effects of optical signals propagating through a network infrastructure is provided. The method may include modulating a phase of a first modulated data signal in accordance with a first clock signal to generate a first modulated output signal. The method may further include modulating a phase of a second modulated data signal in accordance with a second clock signal to generate a second modulated output signal. The first and second modulated output signals may then be combined to supply a combined signal. The clock period of the first and second clock signals may be the same, and a differential phase between the first and second clock signals may be non-zero.

It is to be understood that both the foregoing general description and the following detailed description are exemplary and explanatory only and are not restrictive of the invention, as claimed. Other objects, features and advantages of the embodiments disclosed or contemplated herein will be apparent from the drawings, and from the detailed description that follows below.

BRIEF DESCRIPTION OF THE DRAWINGS

Reference will be made to embodiments of the disclosure, examples of which may be illustrated in the accompanying figures. These figures are intended to be illustrative, not limiting. Although certain aspects of the embodiments are generally described in the context of these embodiments, it should be understood that it is not intended to limit the scope to these particular embodiments. In the drawings wherein like reference symbols refer to like parts.

DETAILED DESCRIPTION OF THE INVENTION

A coherent optical transmitter circuit is disclosed in which chirp is employed in the suppression of nonlinear polarization scattering in dual polarization coherent systems, such as those which employ dual polarization-quadrature phase-shift keying (DP-QPSK). By separately chirping the modulated signals of each polarization tributary signal, the polarization state of the output DP-QPSK signal varies during a time period corresponding to a symbol bit period. Such controlled variations in the output DP-QPSK signal result in the mitigation of nonlinear effects associated with the network infrastructure over which the signal is transmitted, resulting in enhanced system performance. Nonlinear polarization scattering due to interactions between adjacent WDM channels is reduced by an averaging effect resulting from the variation in the state of polarization (SOP) of each channel during a symbol period. Since the signal SOP variation is added at the transmitter in a controlled manner, the receiver can recover the two signal polarization tributaries. Enhanced system performance, such as greater reach or transmission distance and improved signal quality of the transmitted signal can be realized.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, signals transmitted between these components may be modified, re-formatted or otherwise changed by intermediary components.

While various portions of the present disclosure are described relative to specific structures with respect to a photonic integrated circuit using specific labels, such as "transmitter" or "receiver", these labels are not meant to be limiting.

Reference will now be made in detail to the present exemplary embodiments, which are illustrated in the accompanying drawings.

Figure 1:
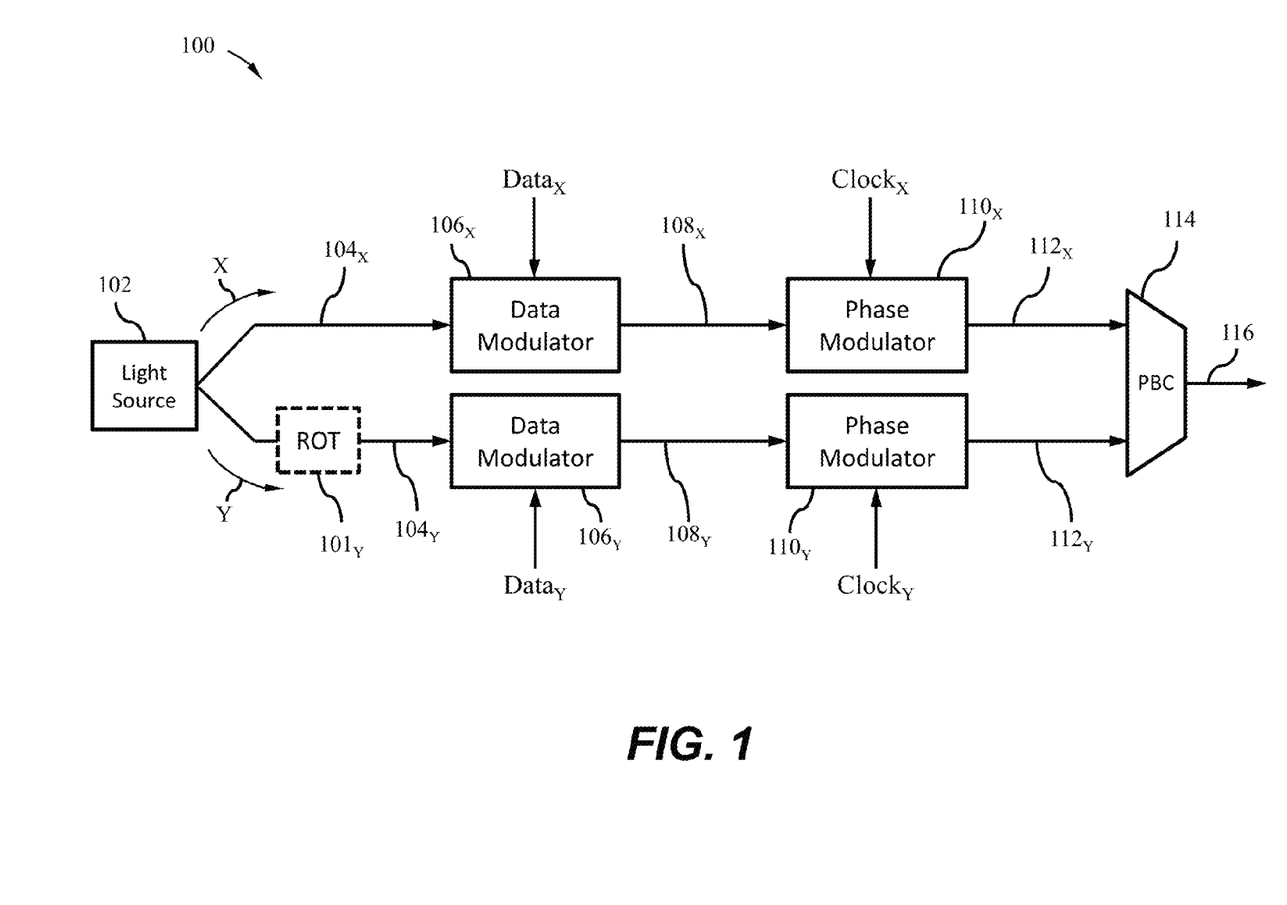
FIG. 1 is a block diagram of a transmitter consistent with various aspects of the present disclosure.

Turning to FIG. 1, a block diagram of a transmitter 100, consistent with various aspects of the present disclosure, is depicted. The transmitter 100 includes a coherent, cw light source 102, a pair of data modulators $106_X$, $106_Y$, a pair of phase modulators $110_X$, $110_Y$, and a polarization beam combiner (PBC) 114. The light source 102 may include a distributed feedback laser or a distributed Bragg reflector laser. The light source 102 provides light $104_X$ of a first polarization to data modulator $106_X$ along a first polarization tributary indicated by arrow X. The data modulator $106_X$ modulates the light $104_X$ with data intended to be transmitted over a network infrastructure, represented by $Data_X$, in accordance with a quadrature phase-shift keying (QPSK) format, to generate a modulated data output signal $108_X$. For example, the data modulator $106_X$ may include in-phase and quadrature (I-Q) modulators for generating the QPSK signals. The data modulator $106_X$ provides the modulated data output signal $108_X$ to phase modulator $110_X$. The phase modulator $110_X$ modulates a phase of the received modulated data output signal $108_X$ in accordance with a first clock or periodic waveform signal, identified as $Clock_X$, to generate a first output signal $112_X$ supplied to the PBC 114. Thus, the phase modulator $110_X$ may be said to introduce chirp with respect to the received modulated data output signal $108_X$. As described more specifically below with respect to FIG. 1B, the clock signal $Clock_X$, in the form of a sinusoidal waveform, induces a corresponding sinusoidal variation of the refractive index of the phase modulator. When the electric field associated with the modulated data output signal $108_X$ passes through the phase modulator $110_X$, the electric field will see a phase shift associated with the varying refractive index. Since it's a periodic change in refractive index to the phase modulator $110_X$, i.e., varying over time, the result is a periodic change in the phase of the corresponding modulated data output signal $108_X$.

Turning to a second polarization tributary Y, the light source 102 also provides light $104_Y$ of a second polarization to data modulator $106_Y$. The second polarization of light $104_Y$ may be rotated with respect to the first polarization of light $104_X$. Light $104_X$ may be provided by the light source 102 directly to the data modulator $106_Y$, or by an optional polarization rotator $101_Y$, shown in dashed line. While shown between the light source 102 and the data modulator $106_Y$, the polarization rotator $101_Y$ may be positioned at any point along the second polarization tributary Y. Polarization rotator $101_Y$, for example, may be part of the light source 102, data modulator $106_Y$, phase modulator $110_Y$ or polarization beam combiner 114. Positioning the optional polarization rotator $101_Y$ in the second polarization tributary Y is for illustration purposes only. If desired, a polarization rotator, similar to the polarization rotator $101_Y$, may be positioned in the first polarization tributary X. Alternatively, each polarization tributary X, Y may include a polarization rotator, such as the polarization rotator $101_Y$, to provide a desired polarization rotation between the first light $104_X$ and the second light $104_Y$. Further, it should be noted that the polarization rotator $101_Y$ is one exemplary element which may be utilized for rotating one of the first and second polarizations of light $104_X$, $104_Y$, other polarization rotating devices are contemplated herein. Others may include, for example, the use of birefringent waveplates, birefringent fiber devices, magneto-optic devices, or polarization preserving fibers with principal axes appropriately arranged relative to one another.

In one example, rotator 101Y may be alternatively provided at an output of data modulator 106Y or phase modulator 110Y. In addition, light source 102, each of the above noted modulators, and polarization beam combiner 114 may be provided on or integrated on a common substrate. In another example, signals 112X and 112Y may be supplied to polarization maintaining fibers, on or both of which may be twisted or rotated so that the light carried by each has a polarization that is substantially orthogonal relative to the other. Such polarization maintaining fibers may provide the polarization-rotated signals as inputs to polarization beam combiner (PBC) 114.

Alternatively, each tributary X, Y may be supplied with light from independent, but phase-locked, light sources (not shown). For example, a first light source 102A may provide light $104_X$ of a first polarization to data modulator $106_X$, and a second light source 102B, phase-locked to light source 102A, may provide light $104_Y$ of a second polarization to data modulator $106_Y$. The second light source 102B may provide the light $104_Y$ directly to data modulator $106_Y$ or via a polarization rotator such as polarization rotator $101_Y$, as discussed above.

The data modulator $106_Y$ modulates the light $104_Y$ with data, represented by $Data_Y$, in accordance with a quadrature phase-shift keying format, to generate a modulated data output signal $108_Y$. The modulated data output signal $108_Y$ is then provided to phase modulator $110_Y$. Similar to the phase modulator $110_X$, the phase modulator $110_Y$ modulates a phase of the received modulated data output signal $108_Y$ in accordance with a second clock or periodic waveform signal, identified as $Clock_Y$, to generate a second output signal $112_Y$ supplied to the PBC 114. The first and second polarizations of the respective first and second output signals $112_X$, $112_Y$ are preferably orthogonal. The polarization combiner 114 combines the received first and second output signals $112_X$, $112_Y$ into a combined output signal 116 provided at an output of the PBC 114. While each of the phase modulators 110 is positioned to receive signals from corresponding data modulators 106, the phase modulators 110 may be positioned prior to the data modulators 106 in each corresponding tributary X, Y, if desired. The data rates of the data $Data_X$, $Data_Y$ are preferably synchronized such that the corresponding symbol rates of the first and second modulated data output signals 108 are synchronized as well. Additionally, in one preferred embodiment, the phase modulators 110 are each driven by sinusoidal waveforms at the symbol rate and synchronized with the symbol period. Other embodiments may use alternative periodic drive waveforms at the symbol clock rate, such as triangular or saw-tooth waveforms, to efficiently generate the required SOP rotation across a symbol period. Adjustment of the relative phase of the first and second clocks $Clock_X$, $Clock_Y$ provides an added degree of freedom in design which did not exist in single polarization systems.

Supplying first and second clocks $Clock_X$, $Clock_Y$ having appropriate characteristics, as defined in more detail below with respect to FIGS. 2A-2C, a net state of polarization of the combined output signal 116 can be controlled such that the state of polarization of the combined output signal 116 varies over each symbol period. Such variations of the net polarization of the output signal 116, described in greater detail below with reference to FIG. 3, provide polarization fluctuations which can be averaged at time periods less than the symbol period. The impact of these variations is to mitigate nonlinear effects in transmitted DP-QPSK signals as part of WDM transmission systems, inter-channel nonlinear effects for example.

Figure 2A:
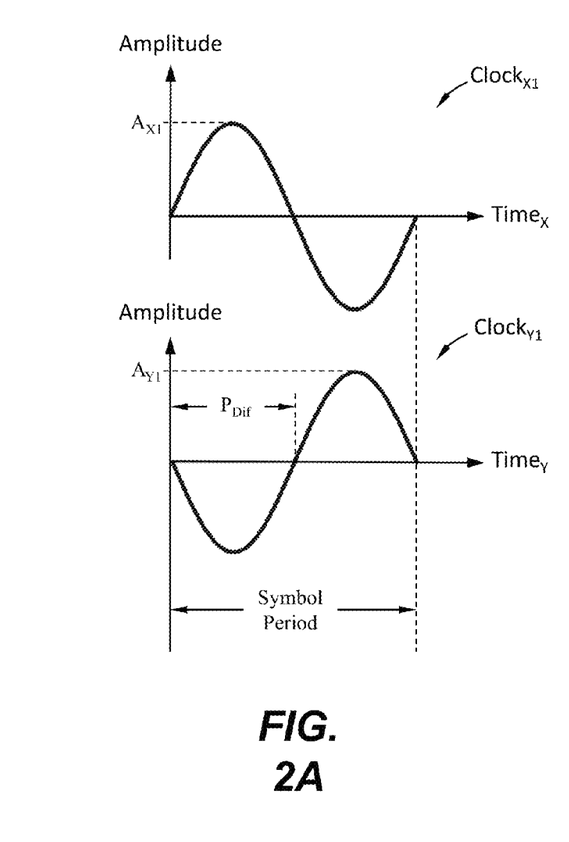
FIG. 2A is a first representation of first and second clock signals provided to elements of the transmitter of FIG. 1.
Figure 2B:
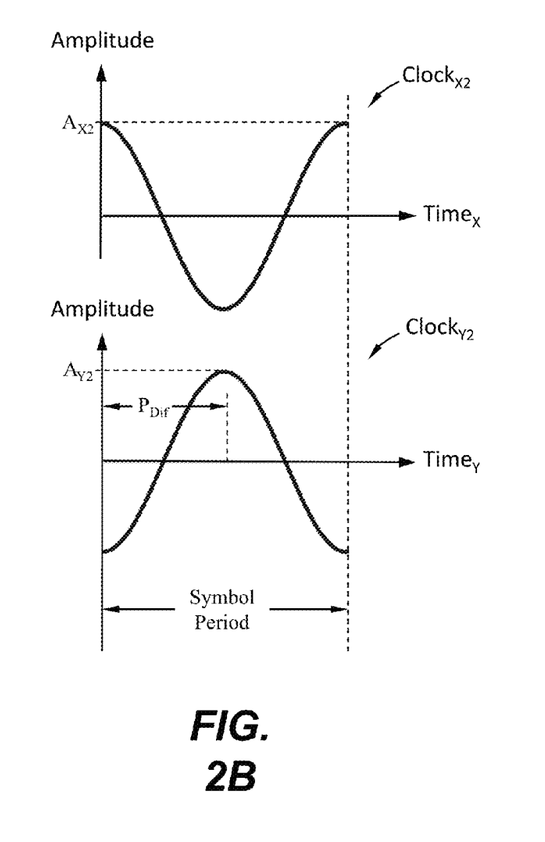
FIG. 2B is a second representation of first and second clock signals provided to elements of the transmitter of FIG. 1.
Figure 2C:
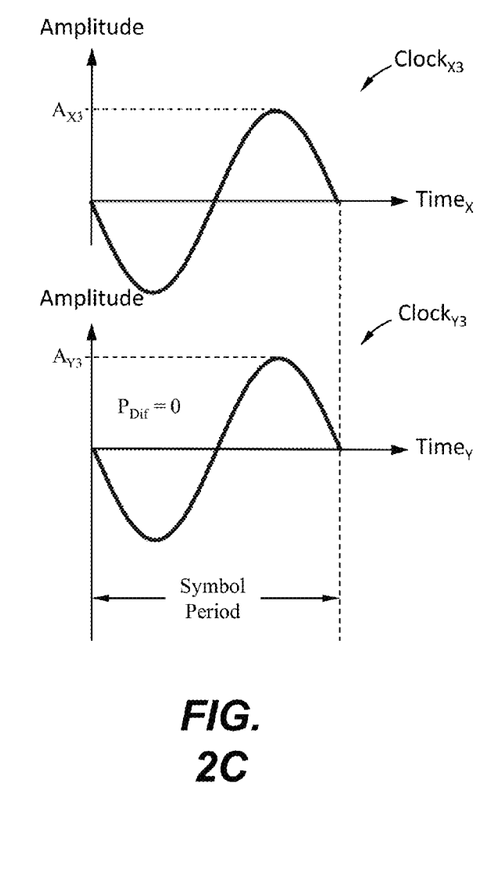
FIG. 2C is a third representation of first and second clock signals provided to elements of the transmitter of FIG. 1.
Figure 3:
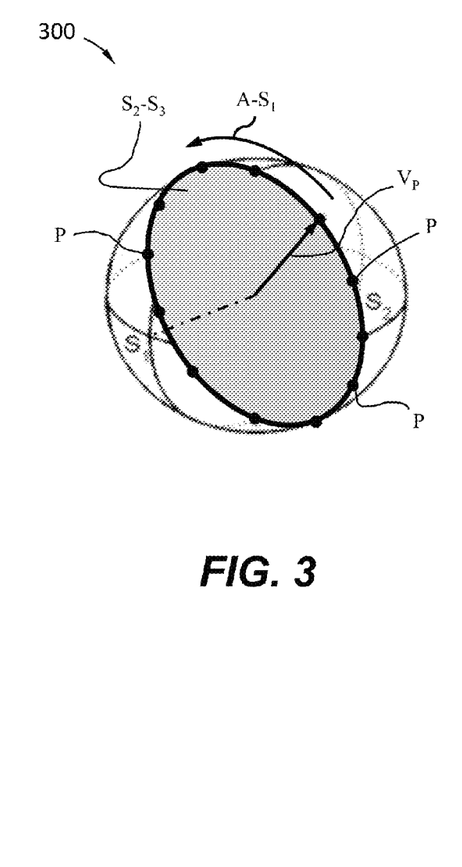
FIG. 3 is a representation of an output of the transmitter of FIG. 1 on a Poincaré sphere.

Turning to FIGS. 2A-2C, exemplary waveforms of the first and second clocks $Clock_X$, $Clock_Y$ will be discussed in greater detail. More specifically, FIG. 2A depicts a first exemplary waveform of $Clock_{X1}$ which may be provided to phase modulator $110_X$ and a first exemplary waveform of $Clock_{Y1}$ which may be provided to phase modulator $110_Y$. Exemplary waveform $Clock_{X1}$ includes an amplitude $A_{X1}$ and a period synchronous with the symbol period of the modulated output signals 108. Similarly, exemplary waveform $Clock_{Y1}$ includes an amplitude $A_{Y1}$ and a period synchronous with the symbol period, however the phase of waveform $Clock_{Y1}$ is preferably shifted with respect to $Clock_{X1}$. More specifically, as depicted in FIG. 2A, the phase of $Clock_{Y1}$ is shifted 180°, or $\pi$ radians, with respect to $Clock_{X1}$, as represented by arrow $P_{Dif}$.

Since the phase shift applied to the modulated signal $108_X$ is proportional to the amplitude of the exemplary waveform $Clock_{X1}$, the exemplary waveform of $Clock_{X1}$, as well as the other exemplary clock waveforms depicted in FIGS. 2A-2C, also provide an indication of the phase shift applied to corresponding modulated data output signals 108. The amplitudes $A_{X1}$, $A_{Y1}$ may be selected to optimize system performance, as discussed in greater detail with respect to FIG. 5A below. The periods of the exemplary waveforms $Clock_{X1}$, $Clock_{Y1}$, while the same as the symbol period of the modulated data output signals 108, are aligned with the symbol period such that clock amplitudes $A_{X1}$, $A_{Y1}$ have maximum and minimum values at one-quarter symbol period and three-quarter symbol period locations along the corresponding time axis $Time_X$, $Time_Y$. Aligning the exemplary waveforms $Clock_{X1}$, $Clock_{Y1}$ as shown in FIG. 2A, with a $\pi$ phase shift between the exemplary waveforms $Clock_{X1}$, $Clock_{Y1}$, results in strong suppression of nonlinear polarization scattering. By modulating the phase of corresponding modulated data output signal 108 a rapid but controlled variation of the signal state of polarization over a symbol period results. With reference to FIG. 3, this variation preferably results in a rapid rotation of the state of polarization of the combined signal 116, as depicted on the Poincaré sphere 300 having three axes labeled as $S_1$, $S_2$, and $S_3$. For example, with no phase shift present between the modulated output signals $108_X$, $108_Y$, one would expect the net state of polarization of the combined signal 116 to be represented by a vector lying along the $S_2$ axis, assuming identical powers in each orthogonal polarization tributary. Once phase shifts are observed with respect to the modulated output signals $108_X$, $108_Y$, due to exemplary waveforms $Clock_X$, $Clock_Y$ for example, the vector may be positioned within the Poincaré sphere 300 at additional locations indicative of such phase shifts.

The vector $V_P$ represents the state of polarization of the combined signal 116. With the exemplary waveforms $Clock_{X1}$, $Clock_{Y1}$ as depicted in FIG. 2A, the net state of polarization of the combined signal 116, represented by the vector $V_P$, rotates about the $S_1$ axis in the plane $S_2$-$S_3$ (shaded), as indicated by the arrow A-$S_1$. The vector $V_P$ makes one complete rotation about the $S_1$ axis during the symbol period, for example starting from a point P along the circumference of the plane $S_2$-$S_3$ and ending at the same point P at the end of the symbol period. It is found that this fast rotation of the net state of polarization of the combined output 116, with respect to the symbol period, tends to average out the impact of nonlinear polarization scattering in the presence of propagating adjacent WDM channels.

Turning to FIG. 2B, a second pair of exemplary waveforms $Clock_{X2}$, $Clock_{Y2}$ are depicted. Exemplary waveforms $Clock_{X2}$, $Clock_{Y2}$ are similar to the waveforms of FIG. 2A, except the phase of each of the waveforms $Clock_{X1}$, $Clock_{Y2}$ is shifted with respect to the symbol period such that maximum and minimum amplitudes $A_{X2}$, $A_{Y2}$ occur at the beginning and end of the symbol period, as well as at the one-half symbol period location along the corresponding axis $Time_X$, $Time_Y$. A similar beneficial effect is obtained with respect to the net state of polarization of the combined output 116 by aligning the phase modulation peaks at symbol center, with a π phase shift, represented by $P_{Dif}$, between the exemplary waveforms $Clock_{X2}$, $Clock_{Y2}$.

For comparison purposes, a third pair of exemplary waveforms $Clock_{X3}$, $Clock_{Y3}$ are depicted in FIG. 2C. Exemplary waveforms $Clock_{X3}$, $Clock_{Y3}$ are similar to exemplary waveforms $Clock_{X1}$, $Clock_{Y1}$ of FIG. 2A, however the phase shift, e.g. $P_{Dif}$, between waveforms $Clock_{X3}$, $Clock_{Y3}$ is 0°. Since the phase shift between the exemplary waveforms $Clock_{X3}$, $Clock_{Y3}$ is 0°, the net state of polarization of the combined signal 116 does not rotate during a symbol period and little benefit is observed, as discussed in greater detail with respect to FIG. 4.

To test the effectiveness of the presented systems and methods, Monte-Carlo simulation studies for both 42.7 Gb/s and 107 Gb/s DP-QPSK WDM transmission over 1,600 km (16 spans×100 km) of standard single mode fiber (SSMF) were performed. The fiber-optic transmission line models a typical legacy dispersion compensating fiber-based dispersion map design, with a pre-dispersion of −300 ps/nm, and residual dispersion per span of +30 ps/nm. The WDM simulation includes 9 signal channels at a spacing of either 50 GHz or 25 GHz for 107 Gb/s and 42.7 Gb/s, respectively. The transmitted signals in each WDM channel are randomly shifted in time and state of polarization to emulate a realistic system, however, polarization mode dispersion is neglected in the fiber model. The optical multiplexer/de-multiplexer filters are modeled as second order super Gaussian filters with full width half maximum (FWHM) bandwidths of 42 GHz and 20 GHz for 107 Gb/s and 42.7 Gb/s, respectively. The transmitter electrical bandwidth is 80% of baud rate, and receiver electrical bandwidth is 50% of baud rate, both modeled as $5^{th}$ order Bessel filters. The laser linewidth is 1 MHz for both transmitter and local oscillator lasers. Amplified spontaneous emission (ASE) noise is added at the receiver to set the received optical signal to noise ratio (OSNR). The digital coherent receiver model includes a finite impulse response filter having a number of taps, each separated by a delay period, as is known in the art. For this simulation, the finite impulse response filter includes 13 taps, each spaced by one-half of a symbol period, with tap coefficients adapted using a Constant Modulus Algorithm, followed by feed forward carrier phase estimation with optimized averaging block size. The QPSK data is differentially pre-coded at the transmitter, and decoded in the receiver after hard decision. A total of 26144 symbols are transmitted to ensure an accurate estimate of the associated bit error rate (BER) using error counting. The BER is converted into an equivalent Q-factor, as an indication of system performance, for convenience of display.

Figure 4:
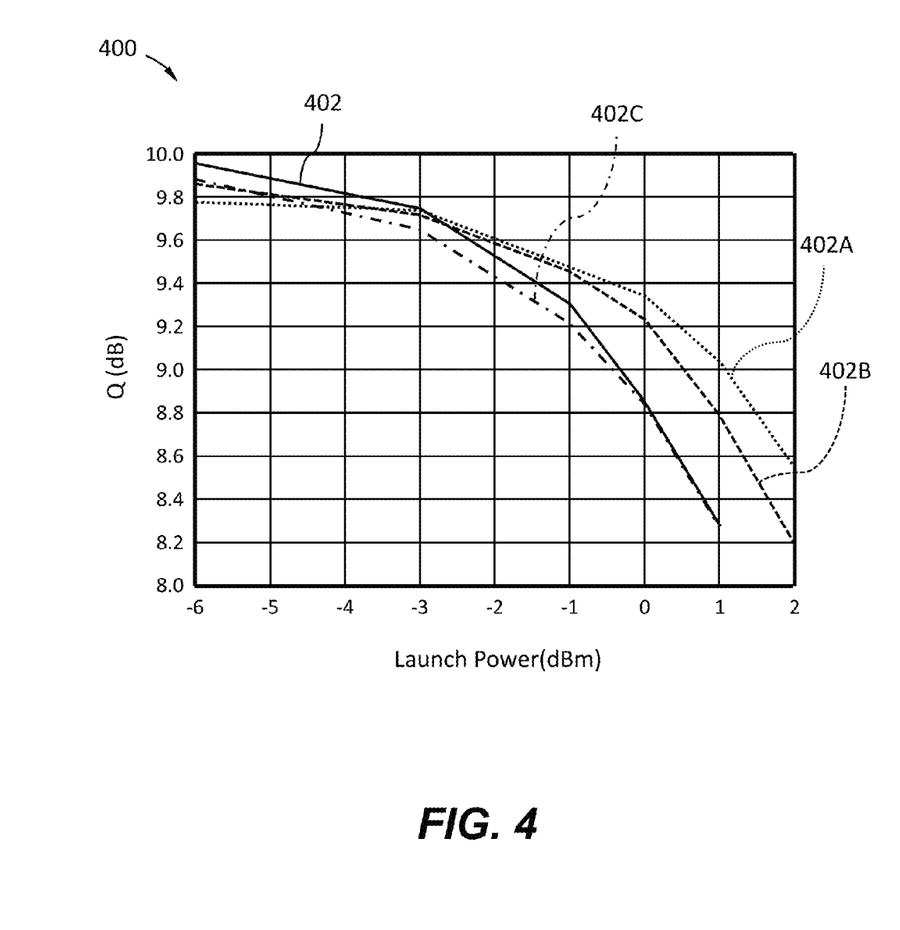
FIG. 4 depicts first simulated results of system performance with respect to launch power, consistent with various aspects of the present disclosure.

Certain 107 Gb/s system simulation results are shown in FIG. 4. The Q-factor, presented in dB, as a function of launch power per channel, presented in dBm, is displayed for the transmitter utilizing the three exemplary waveforms depicted in FIGS. 2A-2C, as well as the case of no chirp depicted by curve 402. Curve 402A corresponds to the use of exemplary waveforms $Clock_{X1}$, $Clock_{Y1}$ of FIG. 2A to chirp or modulate corresponding modulated output signals 108. Curve 402B corresponds to the use of exemplary waveforms $Clock_{X2}$, $Clock_{Y2}$ of FIG. 2B, and curve 402C corresponds to the use of exemplary waveforms $Clock_{X3}$, $Clock_{Y3}$ of FIG. 2C. The received ONSR is fixed at 14.2 dB, defined in a 0.1 nm noise bandwidth. The chirp strength is set by the corresponding phase modulation amplitude A of each exemplary waveform, which is fixed at A=0.3π for the simulations of FIG. 4.

Consistent with the present disclosure, phase modulators 110 may introduce a sinusoidal phase modulation, which will next be described in greater detail.

For a sinusoidal phase modulation process applied to an optical carrier, the time-dependent phase shift Φ (in radians) of the optical carrier due to the phase modulation is $$\Phi(t) = A \sin[\omega\, t + \theta],$$

where ω is the angular frequency (2 π time the frequency of the modulation process in Hz) of the phase modulation process, t is time, A is the absolute value of the maximum phase shift induced by the phase modulation process (amplitude of the phase modulation process, measured in units of radians here), and θ is the "initial phase" of the phase modulation process itself (also given in radians). Accordingly, for example, if the phase modulation amplitude is π radians, and θ=0 radians. Then $$\Phi(t) = \pi \sin[\omega\, t].$$

As generally depicted in the curves 402-402C of FIG. 4, at a fixed OSNR of 14.2 dB, the Q-factor decreases monotonically with increasing launch power due to nonlinear effects. Chirp or phase modulations associated with exemplary waveforms $Clock_{X1}$, $Clock_{Y1}$ and $Clock_{X2}$, $Clock_{Y2}$ corresponding to curves 402A and 402B, respectively, reduce the nonlinear effects at high launch powers. As depicted by curve 402C, chirp or phase modulations of exemplary waveforms $Clock_{X3}$, $Clock_{Y3}$ show no benefit. It is noted that the greatest improvement is achieved when utilizing exemplary waveforms $Clock_{X1}$, $Clock_{Y1}$ of FIG. 2A, the higher launch powers providing for longer reach and lower costs related to associated network infrastructures.

Figure 5A:
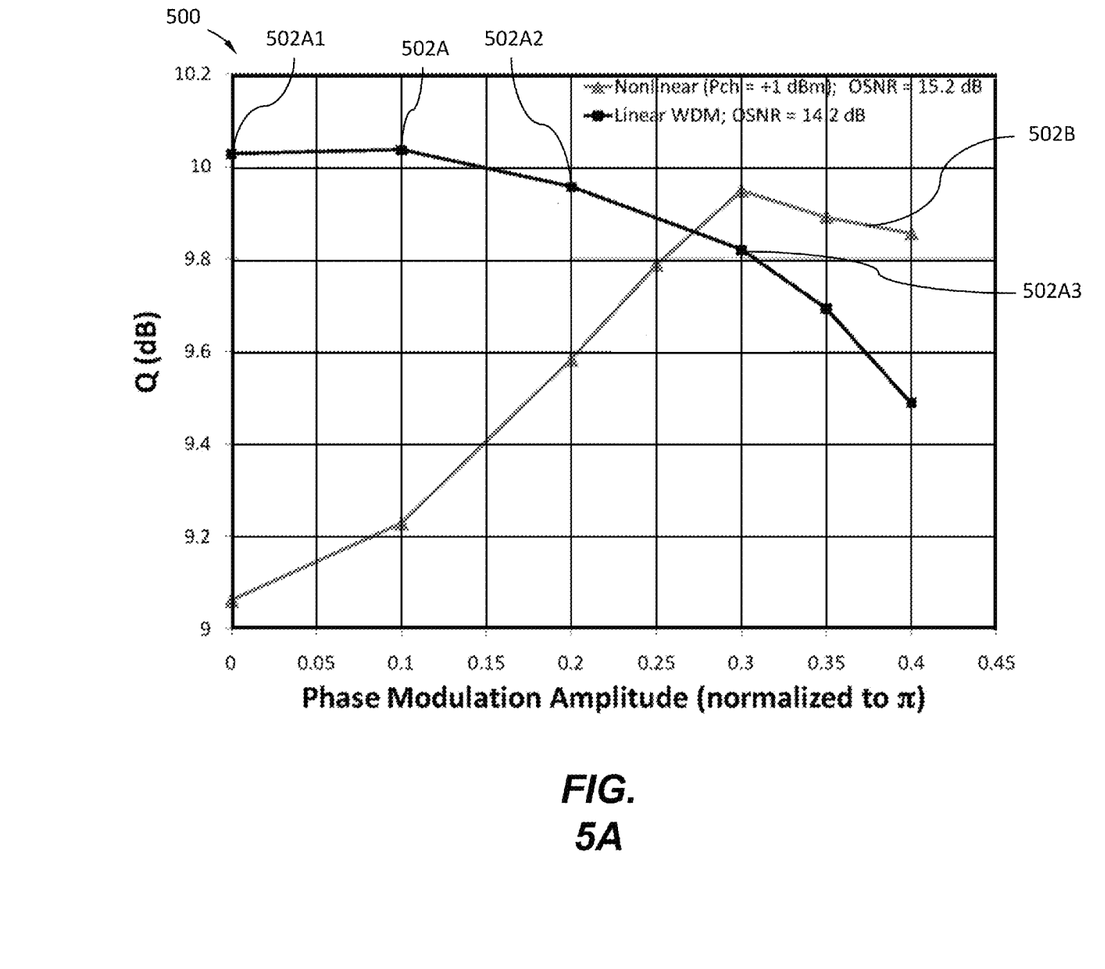
FIG. 5A depicts simulated results of system performance with respect to phase modulation amplitude, consistent with various aspects of the present invention.
Figure 5B:
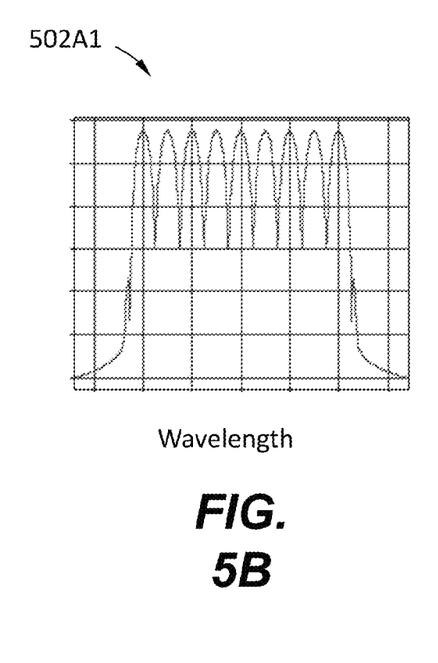
FIGS. 5B, 5C, and 5D each depict detailed output at three corresponding points along a curve of FIG. 5A.
Figure 5C:
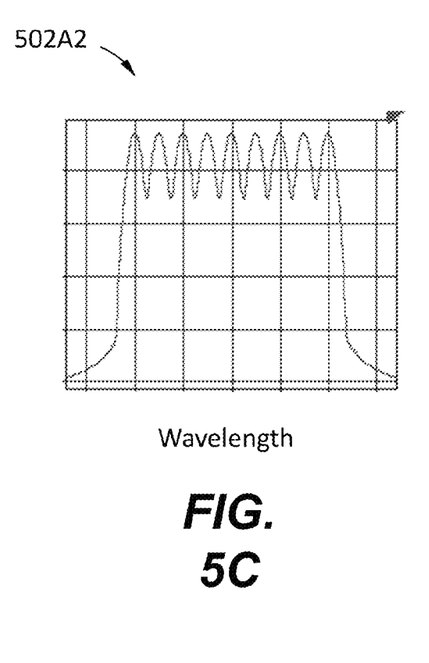
Figure 5D:
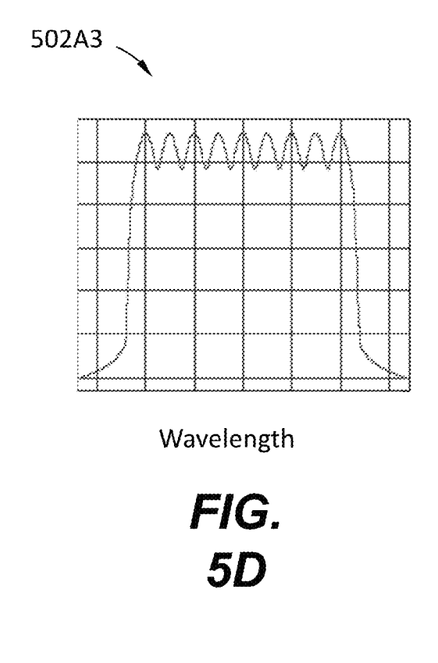

The curves 402A-402C indicate that the associated phase modulated or chirped signals suffer a small penalty in the quasi-linear regime of FIG. 4, near a launch power of −6 dBm, where the corresponding Q-factor dips below the no chirp case depicted in curve 402, for example. Turning to FIG. 5A, the design trade-off between linear penalty and nonlinear benefit can be understood. Here, a Q-factor is plotted as a function of chirp or phase modulation amplitude A in a graph 500. A first curve 502A represents the output of a linear WDM system, the OSNR set to 14.2 dB. Larger amplitudes A result in increased linear penalties due to WDM crosstalk resulting from a broadening of the signal spectrum by chirping. This chirp induced broadening is depicted in FIGS. 5B-5D which correspond to the output amplitudes of the 9 signal channels at points 502A1, 502A2, and 502A3 along the curve 502A where the amplitude A=0, 0.2π, and 0.3π, respectively. Curve 502B corresponds to systems of the present invention in which chirp or phase modulation are provided to compensate for nonlinear effects, as discussed above. Curve 502B corresponds to the launch power of +1 dBm in FIG. 4, but with OSNR increased by 1 dB to 15.2 dB in order to keep the Q values in roughly the same range as depicted by the curve 502A of the linear case. As shown in FIG. 5A, the optimum phase modulation amplitude for a launch power of +1 dBm and utilizing the exemplary waveforms $Clock_{X1}$, $Clock_{Y1}$ of FIG. 2A is found at an amplitude A approximately equal to 0.3π.

Figure 6:
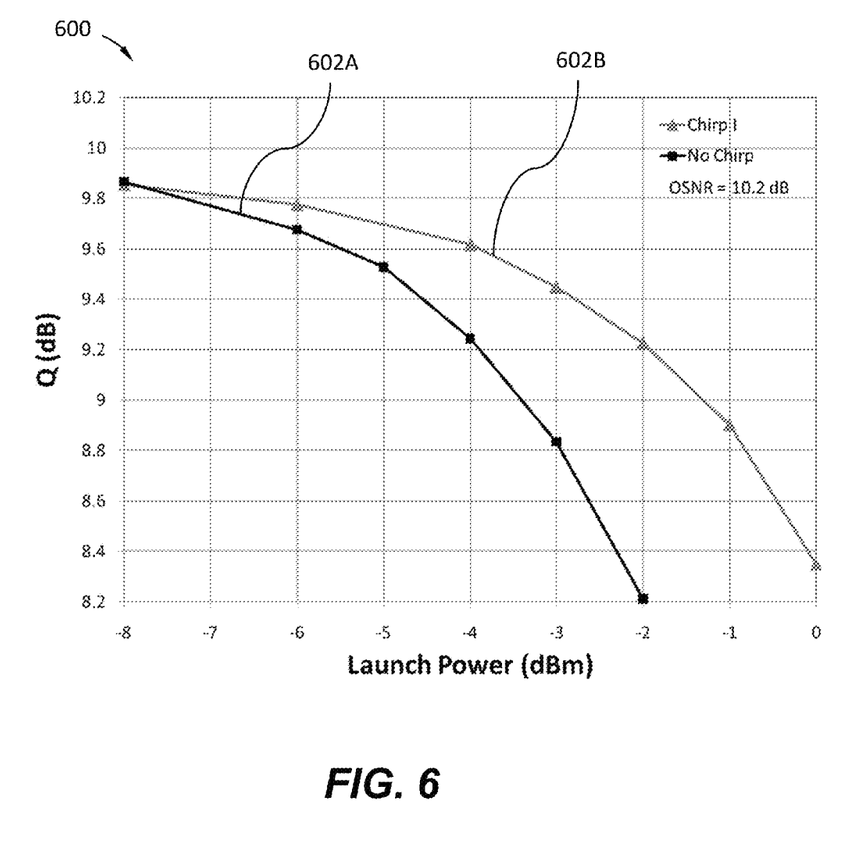
FIG. 6 depicts second simulated results of system performance with respect to launch power, consistent with various aspects of the present disclosure.
Figure 7A:
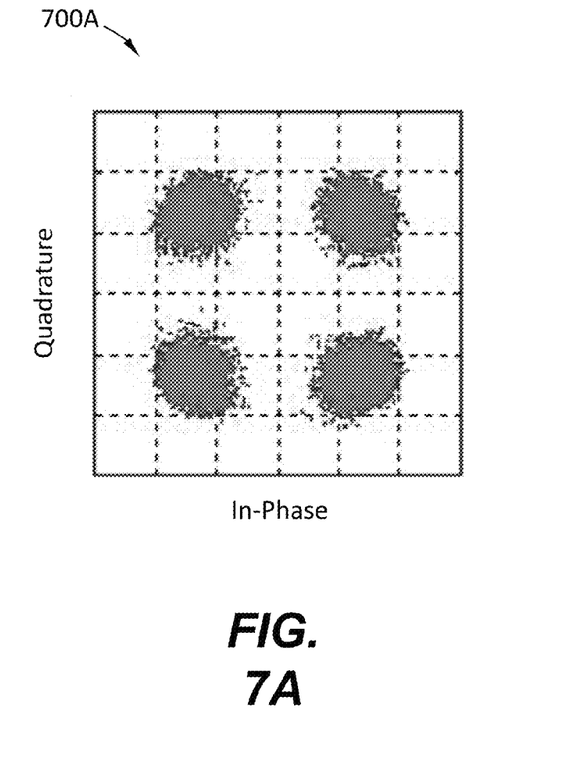
FIGS. 7A and 7B each depict signal constellations corresponding to one of two curves of FIG. 6, consistent with various aspects of the present disclosure.
Figure 7B:
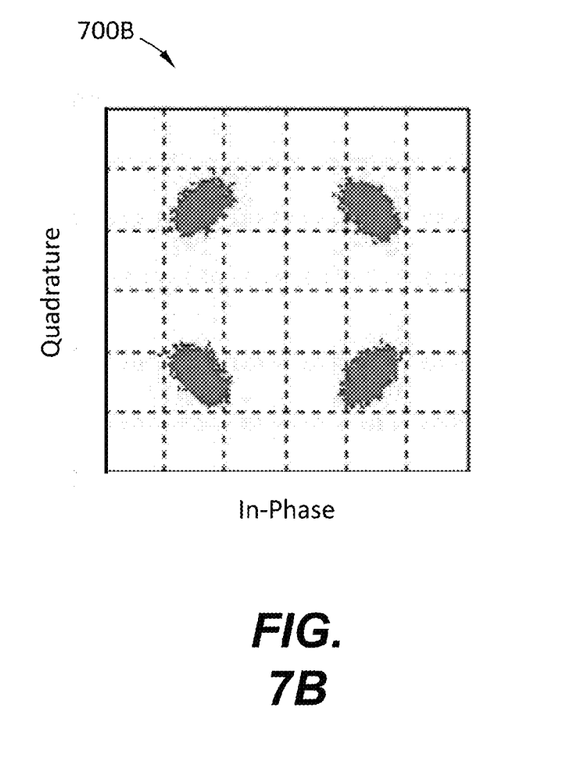
Figure 8A:
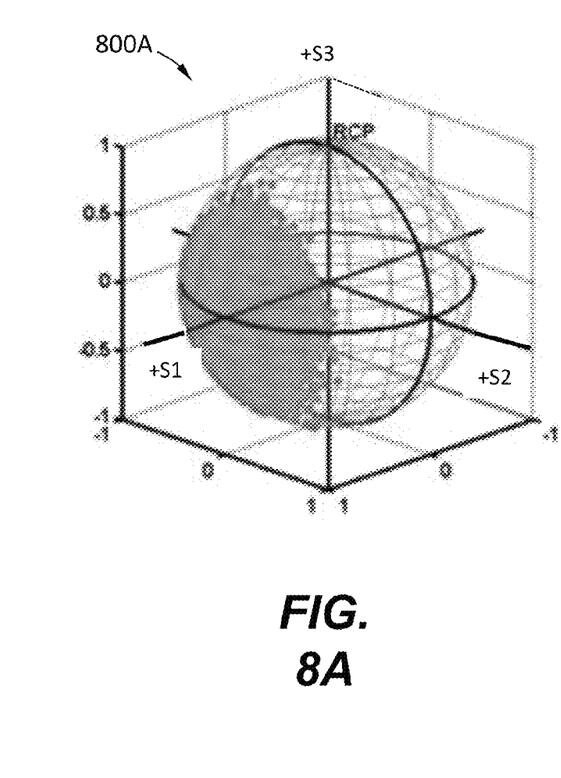
FIG. 8A depicts nonlinear polarization scattering of a continuous-wave signal on a Poincaré sphere, consistent with various aspects of the present disclosure.
Figure 8B:
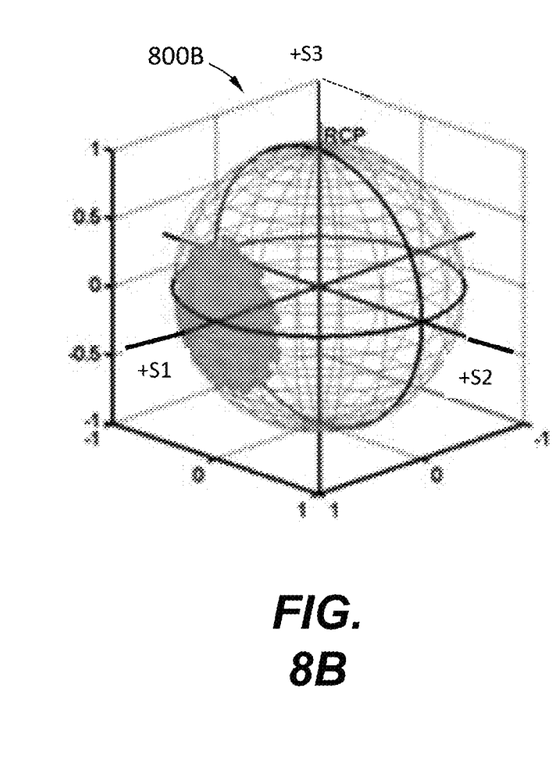
FIG. 8B depicts nonlinear polarization scattering of a continuous-wave signal on a Poincaré sphere, consistent with various aspects of the present disclosure.

Turning to FIG. 6, certain results for a 42.7 Gb/s DP-QPSK system with 25 GHz channel spacing is depicted. The simulation utilizes the design of FIG. 1 employing the exemplary waveforms $\text{Clock}_{X1}$, $\text{Clock}_{Y1}$ of FIG. 2A, and setting the corresponding amplitude $A_X$, $A_Y$ to $0.3\pi$. The received OSNR is set to 10.2 dB, which corresponds to a back-to-back Q of approximately 10 dB for the 42.7 Gb/s system without chirp. Here, back-to-back means to connect the transmitter output to the receiver input through an attenuator, such that propagating effects are not considered. Curve 602A depicts Q as a function of launch power where nonlinear effects are not compensated for, while curve 602B depicts Q as a function of launch power where nonlinear effects are compensated for by employing the exemplary waveforms $\text{Clock}_{X1}$, $\text{Clock}_{Y1}$ of FIG. 2A, and setting the amplitude $A_X$, $A_Y$ to $0.3\pi$. The inter-channel nonlinear effects are expectedly stronger at the tighter channel spacing. Thus, the Q versus launch power curves 602A, 602B of FIG. 6 drop faster as compared with the curves 402 of FIG. 4. The relatively lower baud rate compared with channel spacing, for example a baud rate of 10.7 G symbols per second (Gsps) and channel space of 25 GHz versus a baud rate of 26.75 Gsps and a channel spacing of 50 GHz, also reduces the linear WDM crosstalk penalty from chirping. Defining the nonlinear threshold as the launch power corresponding to a 1 dBQ nonlinear penalty, with chirp, the nonlinear threshold is reached at a launch power of about −1 dBm, while the system without chirp reaches nonlinear threshold at about −3.5 dBm. Thus, chirping yields about a 2.5 dB advantage in launch power. Turning to FIGS. 7A and 7B, simulated received QPSK signal constellations 700A and 700B are depicted for one of the polarization tributaries after equalization and carrier phase recovery with launch power fixed at −2 dBm, and with no ASE present. The constellation 700A of FIG. 7A depicts the signal constellation for the system without chirp compensating for nonlinear effects such as excess noise resulting from crosstalk induced by nonlinear polarization scattering. The less noisy constellation 700B of FIG. 7B corresponds to the case where chirp is utilized to compensate for such nonlinear effects. As an additional qualitative check, a simulation was conducted with a continuous-wave (CW) probe channel surrounded by modulated DP-QPSK aggressor channels, i.e., propagating adjacent channels in the same fiber, with a launch power of −2 dBm. FIGS. 8A and 8B depict samples 800A, 800B of the state of polarization for the CW probe channel at the output of the transmission line, displayed on the Poincaré sphere. Ideally, without any nonlinear interactions, the CW probe channel state of polarization would be a vector represented by S=[1 0 0], the vector of the net state of polarization positioned only along the $S_1$ axis of the Poincaré sphere. However, due to nonlinear polarization scattering, the vector representing the CW probe channel state of polarization is scattered about the point S=[1 0 0], i.e., the $S_1$ axis. The data samples 800A of FIG. 8A depict the case where no chirp compensation is provided, while the data samples 800B of FIG. 8B depict the case where chirp compensation is provided, the difference between the data samples 800A and 800B clearly indicating suppressed nonlinear polarization scattering.

While the above example focuses on the DP-QPSK modulation format, the present invention applies to any dual polarization modulation format, including DP-BPSK, DP-OOK, DP-8PSK, DP-8-Star-QAM, DP-16QAM, etc. Furthermore, as mentioned above, generalizations of the preferred embodiment depicted in FIG. 1 may be possible, including alternative phase modulator drive waveforms optimized for realizing a controlled SOP rotation across a symbol period, while minimizing the deleterious chirp induced spectral broadening.

Figure 9:
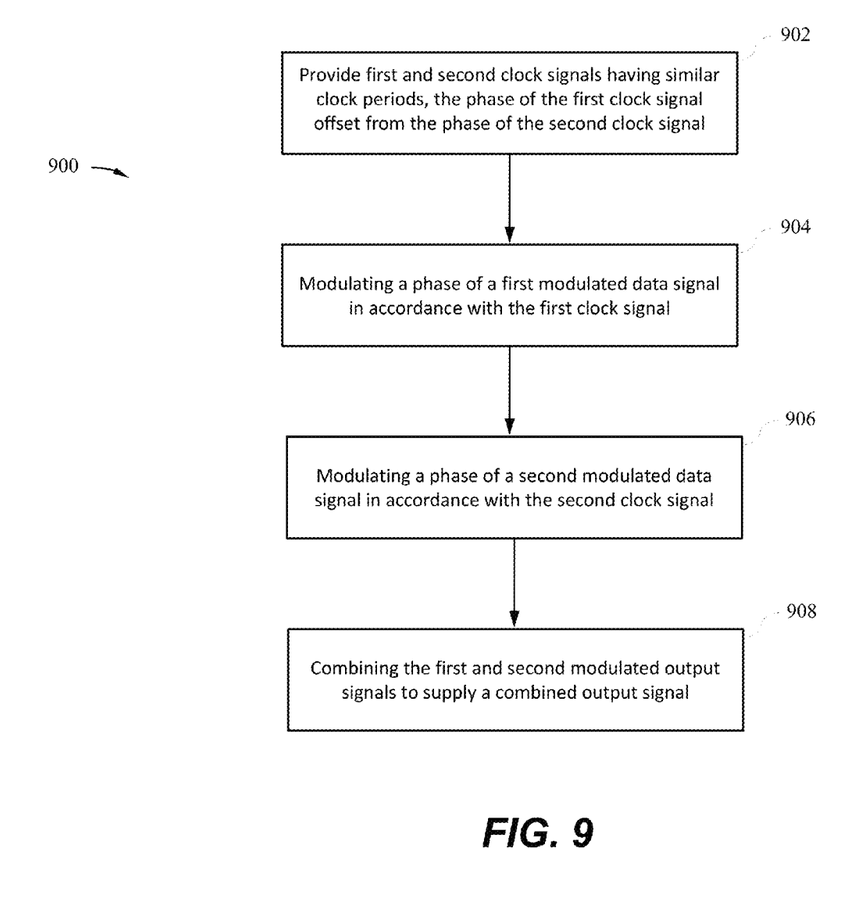
FIG. 9 depicts a flow chart of a method, independent of structure, in accordance with various aspects of the present disclosure.

Turning to FIG. 9, a flow chart of a method, independent of structure, in accordance with various aspects of the present invention, is initiated by providing first and second clock signals having similar clock periods in a step 902. While the periods of the first and second clock signals may be similar, preferably a differential phase shift is provided between the phase of the first clock signal and a phase of the second clock signal. Thus, the phase of the first clock signal is offset from the phase of the second clock signal, the amount of offset being a differential phase between the first and second clock signal. The differential phase is preferably non-zero. In certain embodiments, as discussed above, the differential phase is $\pi$. An amplitude of the first clock signal and an amplitude of the second clock signal may be in a range between 0 and $0.5\pi$, and more preferably $0.3\pi$. The amplitude of the first clock signal may be the same or different from the amplitude of the second clock signal.

The first clock signal is used to modulate a phase of a first modulated data signal in a step 904, and the second clock signal is used to modulate a phase of a second modulated data signal in a step 906. Preferably, a symbol period of the first modulated data signal is the same as a symbol period of the second modulated data signal. More preferably, the symbol period of each of the first and second modulated data signal is the same as the period, or clock period, of each of the first and second clock signals. The first modulated data signal, for example, may be generated through modulation of a first light with a first data stream, and the second modulated data signal may be generated through modulation of a second light with a second data stream. Preferably, the first light has a first polarization which is different than a second polarization of the second light. More preferably, one of the first and second polarizations are shifted 90° with respect to the other of the first and second polarizations. Each of the first and second modulated data signals are in a quadrature phase-shift keying format, for example.

The first and second modulated output signals may be combined to provide or supply a combined output signal in a step 908. By separately modulating or chirping the first and second modulated signals, the polarization state of the combined output signal, e.g. a DP-QPSK signal, varies during a time period corresponding to a symbol bit period. Such controlled variations in the combined output signal result in the mitigation of nonlinear effects associated with the network infrastructure over which the signal is transmitted, resulting in enhanced system performance, which may lead to greater reach and improved signal quality of the transmitted signal.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:
1. A transmitter comprising:
a first data modulator configured to:
  modulate a first light in accordance with a first data stream to generate a first modulated optical signal;
a second data modulator configured to:
  modulate a second light in accordance with a second data stream to generate a second modulated optical signal,
  a polarization of the second light being rotated with respect to a polarization of the first light;

a first phase modulator configured to:
receive the first modulated optical signal, and
modulate a phase of the first modulated optical signal in accordance with a first clock signal to generate a first modulated output signal at an output of the first phase modulator,
a phase modulation amplitude of the first clock signal being between 0 and $0.5\pi$,
the first clock signal having a maximum amplitude that occurs at a beginning of a symbol period of the first clock signal and at an end of the symbol period of the first clock signal, and
the first modulated output signal having a first polarization;
a second phase modulator configured to:
receive the second modulated optical signal, and
modulate a phase of the second modulated optical signal in accordance with a second clock signal to generate a second modulated output signal at an output of the second phase modulator,
the second modulated output signal having a second polarization,
the second clock signal having a minimum amplitude that occurs at a beginning of a symbol period of the second clock signal and at an end of the symbol period of the second clock signal, and
the symbol period of the first clock signal and the symbol period of the second clock signal being measured from a same point in time;
a polarization beam combiner including:
a first input configured to receive the first modulated output signal having the first polarization,
a second input configured to receive the second modulated output signal having the second polarization, and
an output,
the polarization beam combiner being configured to combine the first modulated output signal and the second modulated output signal into a combined output signal provided at the output of the polarization beam combiner,
a differential phase between the first clock signal and the second clock signal being non-zero.

2. The transmitter of claim 1, wherein a symbol period of the first modulated optical signal is the same as a symbol period of the second modulated optical signal.

3. The transmitter of claim 2, wherein the symbol period of the first modulated optical signal is the same as a clock period of the first clock signal.

4. The transmitter of claim 1, wherein the differential phase between the first clock signal and the second clock signal is $\pi$.

5. The transmitter of claim 1, wherein the phase modulation amplitude of the first clock signal is the same as a phase modulation amplitude of the second clock signal.

6. The transmitter of claim 1, wherein the phase modulation amplitude of the first clock signal is different from a phase modulation amplitude of the second clock signal.

7. The transmitter of claim 1, wherein the phase modulation amplitude of the first clock signal is $0.3\pi$.

8. The transmitter of claim 1, further including a light source,
wherein the first and second lights are supplied by the light source.

9. The transmitter of claim 8, wherein the light source is a distributed feedback laser or a distributed Bragg reflector laser.

10. The transmitter of claim 1, wherein the first light is supplied by a first light source and the second light is supplied by a second light source,
the first light source being phase-locked to the second light source.

11. The transmitter of claim 1, wherein each of the first and second data modulators modulate the first and second lights in accordance with a phase-shift keying format.

12. A method comprising:
modulating a first light in accordance with a first data stream to generate a first modulated optical signal;
modulating a second light in accordance with a second data stream to generate a second modulated optical signal,
a polarization of the second light being rotated with respect to a polarization of the first light;
modulating a phase of the first modulated optical signal in accordance with a first clock signal to generate a first modulated output signal,
a phase modulation amplitude of the first clock signal being between 0 and $0.5\pi$,
the first clock signal having a maximum amplitude that occurs at a beginning of a symbol period of the first clock signal and at an end of the symbol period of the first clock signal, and
the first modulated output signal having a first polarization;
modulating a phase of the second modulated optical signal in accordance with a second clock signal to generate a second modulated output signal,
the second modulated output signal having a second polarization,
the second clock signal having a minimum amplitude that occurs at a beginning of a symbol period of the second clock signal and at an end of the symbol period of the second clock signal, and
the symbol period of the first clock signal and the symbol period of the second clock signal being measured from a same point in time;
combining the first modulated output signal having the first polarization and the second modulated output signal having the second polarization to provide a combined output signal,
a differential phase between the first clock signal and the second clock signal being non-zero.

13. The method of claim 12, wherein a symbol period of the first modulated optical signal is the same as a symbol period of the second modulated optical signal.

14. The method of claim 13, wherein the symbol period of the first modulated data signal is the same as a clock period of the first clock signal.

15. The method of claim 12, wherein the differential phase between the first clock signal and the second clock signal is $\pi$.

16. The method of claim 12, wherein the phase modulation amplitude of the first clock signal is the same as a phase modulation amplitude of the second clock signal.

17. The method of claim 12, wherein the phase modulation amplitude of the first clock signal is different from a phase modulation amplitude of the second clock signal.

18. The method of claim 12, wherein the phase modulated amplitude of the first clock signal is $0.3\pi$.

19. The method of claim 12, further including modulating the first light and the second light in accordance with a phase-shift keying format.

20. A transmitter comprising:
a first phase modulator configured to:
receive a first light, and
modulate a phase of the first light in accordance with a first clock signal to generate a first modulated phase signal at an output of the first phase modulator,
a phase modulation amplitude of the first clock signal being between 0 and $0.5\pi$,
the first clock signal having a maximum amplitude that occurs at a beginning of a symbol period of the first clock signal and at an end of the symbol period of the first clock signal, and
the first modulated phase signal having a first polarization;
a second phase modulator configured to:
receive a second light,
a polarization of the second light being rotated with respect to a polarization of the first light, and
modulate a phase of the second light in accordance with a second clock signal to generate a second modulated phase signal at an output of the second phase modulator,
the second modulated phase signal having a second polarization,
the second clock signal having a minimum amplitude that occurs at a beginning of a symbol period of the second clock signal and at an end of the symbol period of the second clock signal, and
the symbol period of the first clock signal and the symbol period of the second clock signal being measured from a same point in time;
a first data modulator configured to:
receive the first modulated phase signal, and
modulate the first modulated phase signal in accordance with a first data stream to generate a first modulated output signal;
a second data modulator configured to:
receive the second modulated phase signal, and
modulate the second modulated phase signal in accordance with a second data stream to generate a second modulated output signal; and
a polarization beam combiner that includes:
a first input configured to receive the first modulated output signal having the first polarization,
a second input configured to receive the second modulated output signal having the second polarization, and
an output,
the polarization beam combiner being configured to combine the first modulated output signal and the second modulated output signal into a combined output signal provided at the output of the polarization beam combiner,
a clock period of the first clock signal being the same as a clock period of the second clock signal, and
a differential phase between the first clock signal and the second clock signal being non-zero.

21. The transmitter of claim 20, wherein a symbol period of the first modulated phase signal is the same as a symbol period of the second modulated phase signal.

22. The transmitter of claim 21, wherein the symbol period of the first modulated phase signal is the same as a clock period of the first clock signal.

23. The transmitter of claim 20, wherein the differential phase between the first clock signal and the second clock signal is $\pi$.

24. The transmitter of claim 20, wherein the phase modulation amplitude of the first clock signal is the same as a phase modulation amplitude of the second clock signal.

25. The transmitter of claim 20, wherein the phase modulation amplitude of the first clock signal is different from a phase modulation amplitude of the second clock signal.

26. The transmitter of claim 20, wherein the phase modulation amplitude of the first clock signal is $0.3\pi$.

27. The transmitter of claim 20, wherein the first and second lights are provided by a light source.

28. The transmitter of claim 27, wherein the light source is a distributed feedback laser or a distributed Bragg reflector laser.

29. The transmitter of claim 20, wherein the first light is supplied by a first light source and the second light is supplied by a second light source,
the first light source being phase-locked to the second light source.

30. The transmitter of claim 20, wherein each of the first and second data modulators modulate the first and second lights in accordance with a phase-shift keying format.

31. A method comprising:
modulating a phase of a first light in accordance with a first clock signal to generate a first modulated phase signal,
a phase modulation amplitude of the first clock signal being between 0 and $0.5\pi$,
the first clock signal having a maximum amplitude that occurs at a beginning of a symbol period of the first clock signal and at an end of the symbol period of the first clock signal, and
the first modulated phase signal having a first polarization;
modulating a phase of a second light in accordance with a second clock signal to generate a second modulated phase signal,
the second modulated phase signal having a second polarization,
the second clock signal having a minimum amplitude that occurs at a beginning of a symbol period of the second clock signal and at an end of the symbol period of the second clock signal, and
the symbol period of the first clock signal and the symbol period of the second clock signal being measured from a same point in time;
modulating the first modulated phase signal in accordance with a first data stream to generate a first modulated output signal;
modulating the second modulated phase signal having the second polarization in accordance with a second data stream to generate a second modulated output signal; and
combining the first and second modulated output signals to generate a combined output signal,
the first light of the first modulated output signal having the first polarization and the second light of the second modulated output signal having the second polarization,
a clock period of the first clock signal being the same as a clock period of the second clock signal, and
a differential phase between the first and second clock signals being non-zero.

32. The method of claim 31, wherein a symbol period of the first modulated phase signal is the same as a symbol period of the second modulated phase signal.

33. The method of claim 32, wherein the symbol period of the first modulated phase signal is the same as a clock period of the first clock signal.

34. The method of claim 31, wherein the differential phase between the first clock signal and the second clock signal is $\pi$.

35. The method of claim 31, wherein the phase modulation amplitude of the first clock signal is the same as a phase modulation amplitude of the second clock signal.

36. The method of claim 31, wherein the phase modulation amplitude of the first clock signal is different from a phase modulation amplitude of the second clock signal.

37. The method of claim 31, wherein the phase modulation amplitude of the first clock signal is $0.3\pi$.

38. The method of claim 31,
   wherein modulating the first modulated phase signal includes:
      modulating the first modulated phase signal in accordance with a phase-shift keying format, and
   wherein modulating the second modulated phase signal includes:
      modulating the second modulated phase signal in accordance with the phase-shift keying format.

* * * * *